United States Patent [19]
Morisada

[11] Patent Number: 5,233,586
[45] Date of Patent: Aug. 3, 1993

[54] SERVO CONTROL SYSTEM FOR CONTROLLING TRACKING OF AN OPTICAL HEAD ON AN OPTICAL DISK

[75] Inventor: Masahiro Morisada, Tokyo, Japan

[73] Assignee: Canon Kabushiki Kaisha, Tokyo, Japan

[21] Appl. No.: 1,406

[22] Filed: Jan. 7, 1993

Related U.S. Application Data

[63] Continuation of Ser. No. 656,005, Feb. 15, 1991, abandoned.

[30] Foreign Application Priority Data

Feb. 16, 1990 [JP] Japan .................. 2-33888
Jan. 29, 1991 [JP] Japan .................. 3-008849

[51] Int. Cl.$^5$ .............................................. G11B 7/00
[52] U.S. Cl. .................. 369/44.32; 369/54; 369/44.36; 360/77.04
[58] Field of Search ............ 369/54, 32, 44.32, 44.29, 369/44.35, 44.36, 44.34, 44.31, 44.13; 360/77.04, 77.02, 78.09

[56] References Cited

U.S. PATENT DOCUMENTS 4,482,989 11/1984 Bierhoff .................. 369/44.36

FOREIGN PATENT DOCUMENTS 256842 2/1988 European Pat. Off. .
0335650 10/1989 European Pat. Off. .

OTHER PUBLICATIONS

Nakagawa, et al., "An Auto-Tuning PID Controller," Advances in Instrumentation, vol. 37, No. 3, Oct. 1982, pp. 1353 through 1362.

Primary Examiner—Aristotelis Psitos
Assistant Examiner—Nabil Hindi
Attorney, Agent, or Firm—Fitzpatrick, Cella, Harper & Scinto

[57] ABSTRACT

Disclosed is a servo control system, which controls the position of a recording and/or reproducing head at the desired track on a record medium, comprising an actuator for moving the head relative to the track, a positional deviation detector, a controller for outputting the control signals for the actuator in such a manner that the head is put in the desired position relative to the track, a component for applying disturbance signals to the output of the controller, and a component for adjusting parameters of the controller which determines the correlation of the transfer characteristics at each frequency.

9 Claims, 3 Drawing Sheets

SERVO CONTROL SYSTEM FOR CONTROLLING TRACKING OF AN OPTICAL HEAD ON AN OPTICAL DISK

This application is a continuation of application Ser. No. 07/656,005 filed Feb. 15, 1991, abandoned.

BACKGROUND OF THE INVENTION

1. Field of the Invention

The present invention relates to a servo control system, and more particularly, is directed to a servo control system suitable for use in recording and/or reproducing heads of optical disk or magnetic disk units.

2. Related Background Art

In general, on an optical disk, magnetic disk or other rotating recording media, there are formed spiral or concentric tracks on which information is recorded. When information is recorded on the tracks or information stored on the tracks is reproduced, a tracking servo control and/or a focusing servo control may be carried out in order that a data recording head or reproducing head can properly trace the tracks.

FIG. 1 shows an example of the control system for accomplishing the tracking servo control, in which the reference numeral 1 denotes a tracking error detector (including an A/D converter) for detecting deviation data between an optical head and a target track (strictly speaking, deviation data between the light beam spot irradiated by the optical head and the target track), in other words, tracking error signals which indicate the error deviation between the optical head and the target track by means of, for instance, a well-known push-pull method. Also, the reference numeral 2 designates a digital compensator which operates or computes by use of tracking error signals the controlled variable of an actuator 4 for driving the optical head (the actuator which is referred to hereat indicates a tracking actuator and/or a focusing actuator). This digital compensator 2 operates at the predetermined sampling period the controlled variable of the actuator 4 in conformity with the given operation expressions so as to move the optical head to the target track based on the tracking error signals and outputs the results as the control signals into a drive circuit 3 (including a D/A converter). Thereby the drive circuit 3 drives the actuator 4 in accordance with the control signals to move the optical head to the target track. For each sampling, the control signal is thus output into the actuator 4 to move the optical head to the original target track immediately in case the optical head deviates from its target track, thus keeping the optical head in place on the track. That is to say, a servo control loop is constituted by the tracking error detector 1, the digital compensator 2, the drive circuit 3, and the actuator 4.

The same may be said of the focusing servo control.

In the conventional servo control system, however, the control variable is operated by the digital compensator without changing various parameters of the operation expression. As a matter of fact, however, due to changes in the environmental conditions such as secular change or temperature change of the actuator, the tracking capacity of the optical head for the target track is impaired. In this case, the foregoing parameters may be changed, whereas the parameters are initially set, so that it can not cope with such change in the environment. It was thus impossible to perform an exact tracking servo control and/or focusing servo control.

SUMMARY OF THE INVENTION

The present invention was conceived to eliminate the above problems, of which objective is to provide a servo control system which is capable of conducting an exact tracking servo control and/or focusing servo control over a long period of time despite of the secular change of the actuator or the environmental change of the system.

The object mentioned above is achieved by a servo control system according to the present invention, which controls the position of a recording and/or reproducing head relative to the desired track on a record medium, comprising; an actuator for moving the head relative to the track, a positional deviation detecting means for detecting the positional deviation of the head relative to the track and for outputting a positional deviation signal, a control means for outputting the control signals for the actuator in such a manner that the head is put in the desired position relative to the track, by use of the positional deviation signals obtained by the detecting means for each predetermined sampling, wherein a servo control loop is constituted by the actuator, the detecting means and the control means, a means for applying disturbance signals to the output of the control means, and a means for adjusting parameters of the control means which determines the correlation of the transfer characteristics at each frequency of the servo control loop between the detection position of the output of the detecting means and the detection position of the output of the control means to which the disturbance signal is applied, by use of the output of the detecting means and the output of the control means to which the disturbance signal is applied.

DETAILED DESCRIPTION OF THE PREFERRED EMBODIMENTS

One embodiment of the present invention will now be described in detail with reference to the accompanying drawings.

Figure 1:
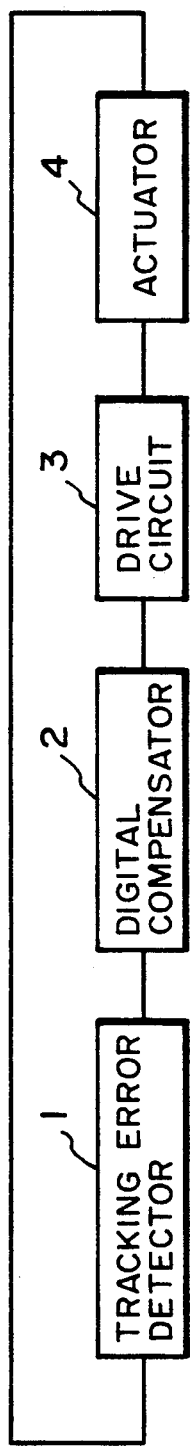
FIG. 1 is a block diagram showing the conventional servo control system.
Figure 2:
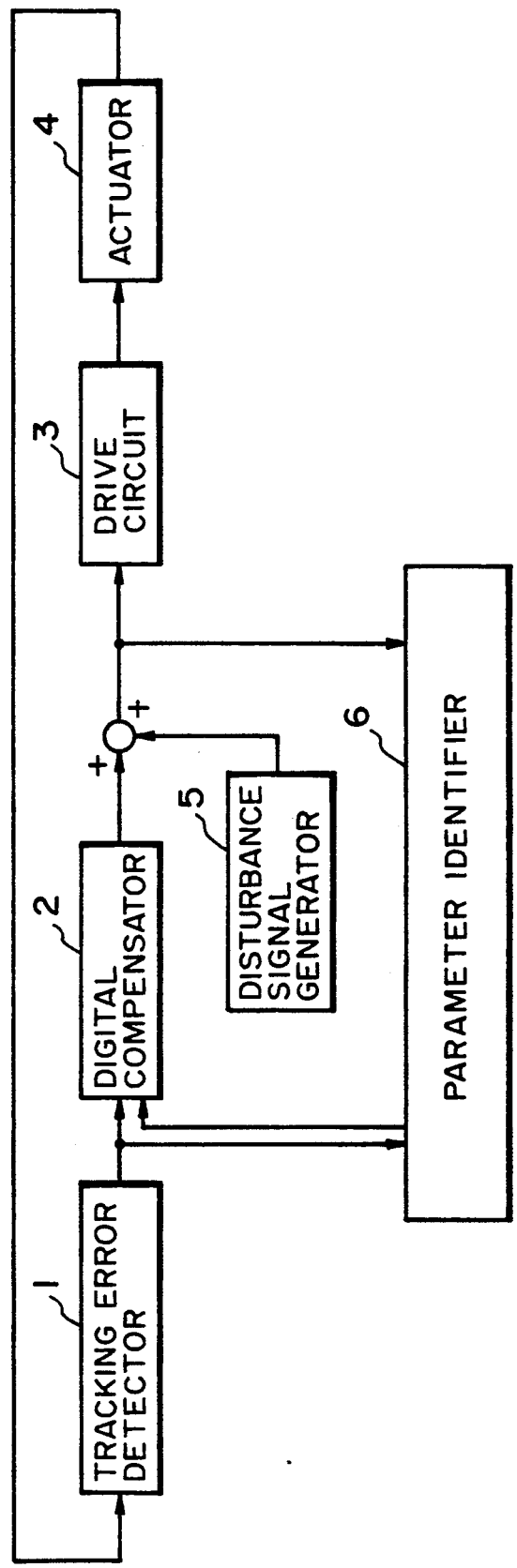
FIG. 2 is a block diagram showing an embodiment of the servo control system according to the present invention.

FIG. 2 is a block diagram showing an embodiment of the servo control system according to the present invention, which is applied to a tracking servo control system adapted to cause the data read/write optical head to follow the target track formed on rotating record media such as an optical disk which rotates at a constant speed. In FIG. 2, identical elements are designated by the same references as those in the conventional system, of which description will hence be omitted.

In FIG. 2, the reference numeral 5 is a disturbance signal generator which generates a disturbance signal in synchronism with a digital compensator 2. The disturbance signal generated hereat is applied to the control output of the digital compensator 2. When the disturbance signal is applied, a drive circuit 3 identifies or adjusts the respective parameters for the drive circuit 3, an actuator 4, and a tracking error detector 1 as will be described later, in the state where the actuator 4 is compulsorily vibrated while applying the disturbance signal to the control signal.

The operation of the disturbance signal generator 5 is controlled by a CPU not shown, and generates the disturbance signal only at the time of identifying parameters. Identity of the parameters may be carried out when the record medium is replaced or electric power is supplied, or may be periodically performed at regular intervals of time. Furthermore, in the present invention, the disturbance signal is generated through software in the form of the M sequence signal (Maximum length linearly recurring sequence signal) having the predetermined amplitude.

A parameter identifier 6 accomplishes identity of the controlled parameters through software processing on the basis of the tracking error signal which is detected by the tracking error detector 1, and the control signal of the digital compensator 2 to which the disturbance signal is applied. The digital compensator 2 is then updated in accordance with the result thus obtained. As an algorithm for the parameters identification, for example, the method of least squares is known, which will be described later in more detail.

Figure 3:
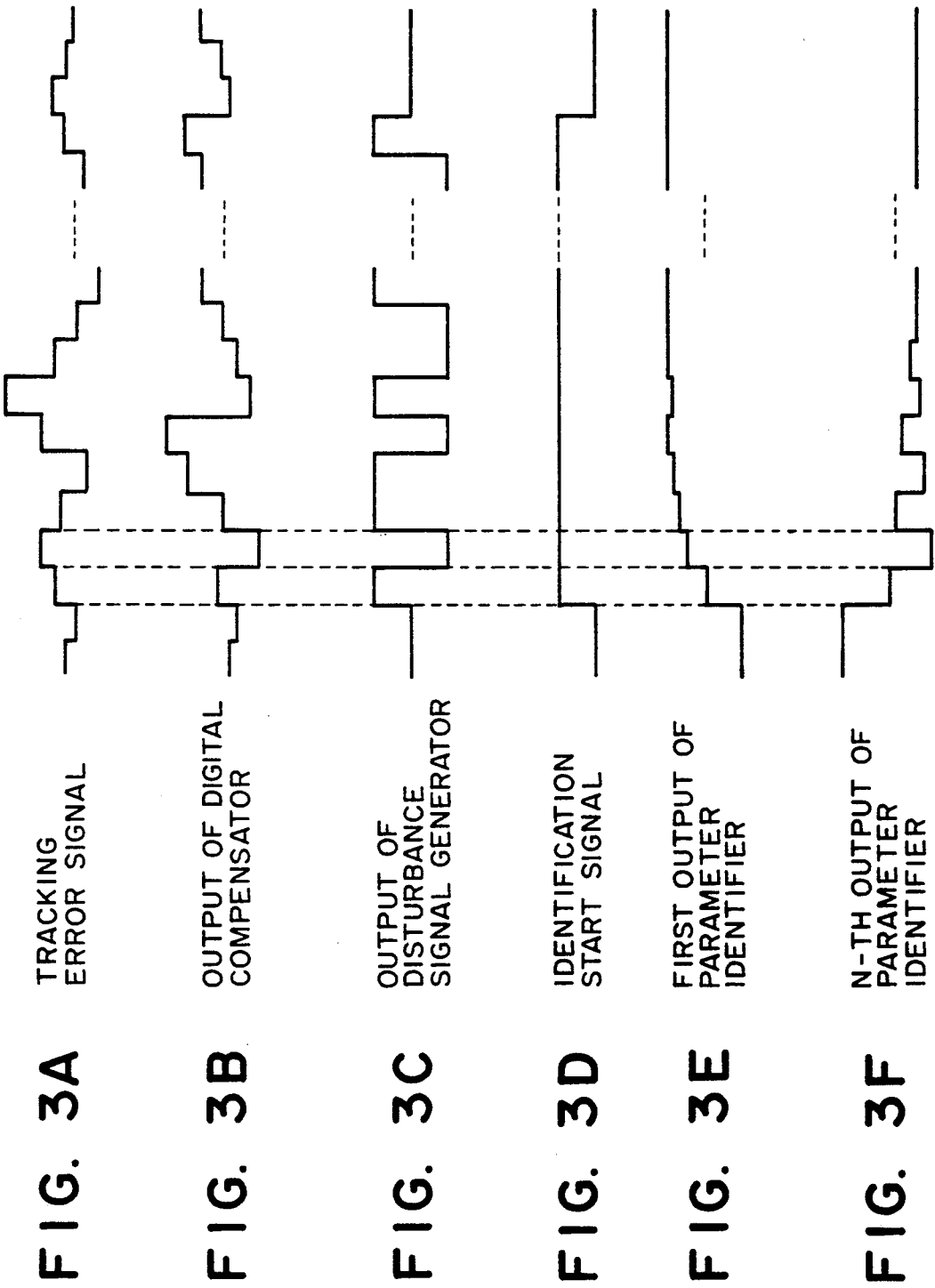
FIGS. 3A to 3F are timing charts showing the operations of the system as illustrated in FIG. 2.

Hereat, the deviation between the optical head driven by the actuator 4 and target track is detected by the tracking error detector 1, and output in the form of tracking error signals at every predetermined period as shown in FIG. 3A. The digital compensator 2 computes required values at every predetermined interval of time as shown in FIG. 3B in such a manner that the optical head can be positioned on the target track in compliance with the tracking error signal, and outputs a control signal. On the other hand, the disturbance signal generator 5 outputs the M sequence signal having the predetermined amplitude as shown in FIG. 3C in synchronism with the digital compensator 2. The sum of this M sequence signal which is output in the form of disturbance signal and the digital compensator 2 is output to the drive circuit 3 as a control input. The drive circuit 3 drives the actuator 4 based on the resultant control input, thus causing the actuator 4 to vibrate through the disturbance signal as stated above.

In the meantime, simultaneously with the generation of the disturbance signal, a parameter identification start signal as shown in FIG. 3D is output to the parameter identifier 6 through the CPU not shown. The parameter identifier 6 identifies the respective parameters by use of the tracking error signal and the foregoing control input. In other words, the parameter identification is carried out with respect to the discrete system dynamic characteristics composed of the drive circuit 3, the actuator 4, and the tracking error detector 1. Based on the results, the digital compensator 2 is then updated. FIG. 3E shows the first output of the parameter identifier 6, while FIG. 3F shows the N-th output of the same, in which N parameters in the digital compensator 2 can be identified through outputs of the parameter identifier 2.

Incidentally, the output of the tracking error detector 1 and the output of the digital compensator 2 include a rotational frequency component resulting from eccentricity of the disk-like record medium and the frequency component by integral times thereof. As a result, when the record medium rotates at a constant speed, the optical head deviates periodically relative to the target track due to the foregoing frequency component. That is, the periodic disturbance arising from eccentricity of the record medium is introduced into the control system, to cause the optical head to be displaced relative to the target track. In consequence, in the above embodiment, provided that the parameter identification is carried out while rotating the record medium, the result of the parameter identification may be quite different from the true value due to the periodic disturbance. Therefore, the rotation of the record medium must be stopped in case of the parameter identification.

Figure 4:
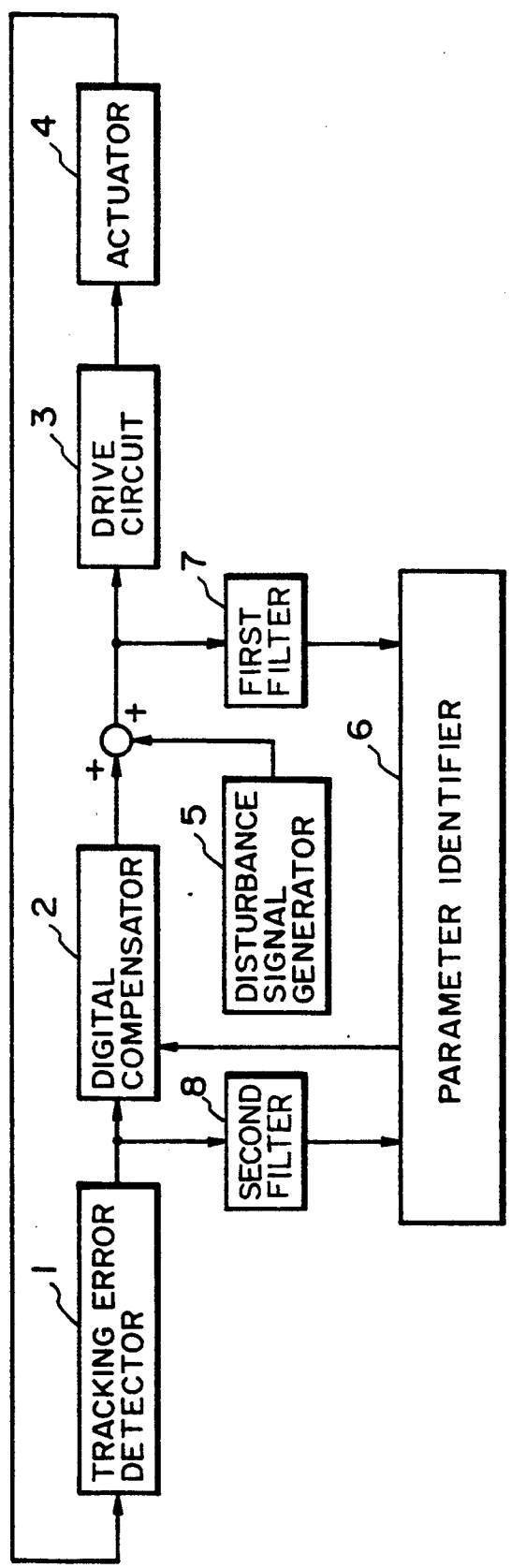
FIG. 4 is a block diagram showing another embodiment of the servo control system according to the present invention.

Hence, another embodiment in which parameter identity can be carried out while rotating the record medium will next be described with reference to FIG. 4. The functions of the first filter 7 and the second filter 8 according to the present invention are subjected to software processing through the parameter identifier 6 as will be described below. FIG. 4 is therefore a functional block diagram. The first filter 7 and the second filter 8 are digital filters which operate in synchronism with the digital compensator 2. Incidentally, the sampling period of the digital compensator 2 is determined by the sampling period of the tracking error detector 1, and the latter is set so as to have the following relationship with the rotation period of the record medium:

T=nh [T designates a rotation period of a record medium, n an integer, and h a sampling period of the detecting means]

The first filter 7 filters the outputs of the digital compensator 2 and the disturbance signal generator 5 to input it into the parameter identifier 6. The second filter 8 also filters the output of the tracking error detector 1 to input it into the parameter identifier 6. The first and second filters serve as filters which remove the rotational frequency component and its integral times frequency component of the record medium. In consequence, the signal input into the parameter identifier 6 is free from the frequency component of the periodic disturbance attributable to the eccentricity of the record medium. The parameter identifier 6 identifies the respective parameters of the digital compensator 2 by use of the outputs of the first filter and the second filter 8, thereby updating the digital compensator 2 based on the obtained result.

The signal input into the parameter identifier 6 is free from the frequency component of the periodic disturbance as described above, so that it is not affected by the eccentricity of the record medium even though the record medium is in rotation. In consequence, in this embodiment the recording medium need not be stopped every time parameter identity is carried out, to thereby enable the parameter identity with the record medium rotating in the operation mode of the system, leading to the great practical efficiency.

Next, the algorithm for the parameter identity will be explained. A well known method of least squares, for example, may be used as the algorithm for identifying the parameter, where by the application of difference equational expression for the control, the following can be said.

The drive circuit 3, the actuator 4, and the tracking error detector 1 are regarded as one controlled object, the dynamic characteristics of which can be expressed by the following equation (a).

$$A(z^{-1})y(k) = B(z^{-1})u(k) + v(k) + r(k) \qquad (a)$$

$$A(z^{-1}) = 1 + a_1 z^{-1} + \ldots + a_n z^{-n}$$

$$B(z^{-1}) = b_1 z^{-1} + \ldots + b_n z^{-n}$$

In the equation (a), k designates a time, y(k) a value of the tracking error signal at time k, u(k) a value of the control input (input of the drive circuit 3) at time k, and r(k) an equation error at time k. Moreover, v(k) represents periodical displacement of the absolute position of the optical head relative to the target track at time k, which is caused by the rotation of the record medium. $Z^{-1}$ represents an operator showing delays, $A(Z^{-1})$ a denominator polynomial for the controlled object, and $B(z^{-1})$ a numerator polynomial for the controlled object. In addition, the period of v(k) is equal to the rotation period T of the record medium. Next, with the filter as defined by the equation (b), the equation (c) would be established in virtue of the nature of the v(k).

$$H(z^{-1}) = 1 - 2\cos\omega z^{-1} + z^{-2} \qquad (b)$$

$$\omega = \frac{2\pi}{(T/h)}$$

where, h: sampling period of the digital compensator $$H(z^{-1})v(k) = 0 \qquad (c)$$

Here, the equations (d), (e) are defined as:

$$y_n(k) = H(z^{-1})y(k) \qquad (d)$$

$$u_n(k) = H(z^{-1})u(k) \qquad (e)$$

As defined in this manner, the equation (a) is transformed into the following equation (f) by use of the equations (c), (d) and (e).

$$A(z^{-1})y_n(k) = B(z^{-1})u_n(k) + r_n(k) \qquad (f)$$

Where, $r_n(k) = H(z^{-1})r(k)$

Therefore, by transforming the equation (a) into the equation (f), the well known algorithm for parameter identification such as the method of least squares or auxiliary variable method can be employed. Incidentally, the equation (d) is used to accomplish the second filter 8 whereas the equation (e) is for the first filter 7.

For instance, the algorithm employing the method of least squares can be expressed as follows.

Now, if $\theta^T = [a_1, a_2, \ldots, a_n, b_1, b_2, \ldots, b_n]$ (T represents the transposition of the matrix)

$$z^T(k) = [-y_n(k-1), -y_n(k-2), \ldots, -y_n(k-n), u(k-1), u(k-2), \ldots, u(k-n)]$$

the equation (f) can be written as:

$$y_n(k) = z^T(k)\theta + r_n(k)$$

In the above equation, when $k = 1, 2, \ldots, N$, the following N equations can be established.

$$\begin{cases} y_n(1) = z^T(1)\theta + r_n(1) \\ y_n(2) = z^T(2)\theta + r_n(2) \\ \vdots \\ y_n(N) = z^T(N)\theta + r_n(N) \end{cases}$$

Here, when $$y_n^T = [y_n(1), y_n(2), \ldots, y_n(N)]$$

$$r_n^T = [r_n(1), r_n(2), \ldots, r_n(N)]$$

$$Z^T = [z(1), z(2), \ldots, z(N)]$$

they can be transformed as:

$$y_n = Z\theta + r_n$$

Consequently, which minimizes the formula $$J = \sum_{k=1}^{N} r_n(k)^2 = (y_n - Z\theta)^T(y_n - Z\theta)$$

is the result of the identification, which can be obtained by the expression as:

$$\theta = (Z^T Z)^{-1} Z^T y$$

By use of thus established, the coefficients for $A(Z^{-1})$, $B(Z^{-1})$ can be identified. The resultant coefficients for $A(Z^{-1})$ and $B(Z^{-1})$ identified in this manner are used to design the digital compensator 2 as follows.

Firstly, assume that the digital compensator 2 is expressed by the following expression;

$$D(z^{-1})u(k) = N(z^{-1})y(k)$$

where, $$D(z^{-1}) = 1 + d_1 z^{-1} + \ldots + d_m z^{-m}$$

$$N(z^{-1}) = n_0 + n_1 z^{-1} + \ldots + n_p z^{-p}$$

At this time, the conditions for stabilizing the control system is that the solution lies within the unit circle on the complex plane when a polynomial $A(z^{-1})D(z^{-1}) + B(z^{-1})N(z^{-1})$ is represented as the equation $A(z^{-1})D(z^{-1}) + B(z^{-1})N(z^{-1}) = 0$ In consequence, by choosing appropriately the order m of $N(z^{-1})$ and the order p of $D(z^{-1})$, the coefficients of $N(z^{-1})$ and $D(z^{-1})$ which satisfy the above conditions can be determined. That is to say, the digital compensator 2 which stabilizes the control system can be obtained. In addition, the digital compensator 2 optimizes the dynamic characteristics of the controlled object composed of the drive circuit 3, the actuator 4, and the tracking error detector 1.

In other words, the correlation of the transfer characteristics is optimized at respective frequencies between the detection point on the servo loop of the tracking error signal used at the time of parameter identification, and the detection point of the input signal to the drive circuit 3 to which disturbance signal is applied.

In the above example, the filter is represented by the equation (b) by way of example, but the following equation (g) may be used instead.

$$H(z^{-1}) = 1 - z^{-N} \quad \text{(g)}$$

where, $N = T/h$. The filter may also have a function for lowering the high frequency component or the low frequency component as well as the function for lowering the rotational frequency component of the record medium. For instance, the above-mentioned equations (a) and (g) may be substituted by the following equations (h) and (i).

$$H(z^{-1}) = (1 - 2\cos\omega z^{-1} + z^{-2})F(z^{-1}) H(z^{-1}) = (1 - 2\cos\omega z^{-1} + z^{-2})F(z^{-1}) \quad \text{(h)}$$

$$H(z^{-1}) = (1 - z^{-N})F(z^{-1}) \quad \text{(i)}$$

In the equations (h) and (i), $F(z^{-1})$ denotes a filter having a low-pass property or a high-pass property, or a band-pass property. When $F(z^{-1}) = 1 - z^{-1}$, for instance, direct-current component of the filter input signal can be attenuated.

Moreover, in the present embodiment, the digital filter is used as the first and the second filter, but an analogue filter may be used instead. In addition, as disturbance signal, not only M sequence signal but also Gaussian white noise or random numbers may be used. A rectangular wave signal is also acceptable. The disturbance signal may be produced by either software or hardware. As to the identification of the parameter, the algorithm for parameter identification may be applied after the data input through the filters are temporarily stored together into the storage device such as semiconductor memory or disk. The serial algorithm for identifying the parameters may be also applied to the data which is input from the filters in synchronism with the digital compensator.

Besides, the transfer characteristics which are referred to in the present invention means the frequency characteristics, which shows how the ratio of amplitude at the output to that at the input of the control system, and the phase shift would be varied in accordance with the frequency.

According to the present invention as described above, the parameters of the control means for controlling the head are so adjusted that a precise control can be always carried out relative to the target track despite the secular change of the actuator or the environmental change. Also, the filters are used to attenuate the given frequency component including the rotational frequency component of the record medium, thus eliminating the effect of rotation caused by the rotating record medium, to consequently ensure the precise identification of the parameters.

I claim:

1. A servo control system which controls the position of a recording and/or reproducing head relative to a desired track on a record medium, said system comprising:

an actuator for moving said head relative to said track;

positional deviation detecting means for detecting a positional deviation of said head relative to said track and for outputting a positional deviation signal;

control means for outputting the control signals for said actuator in such a manner that said head is put in a desired position relative to said track, by use of the positional deviation signals obtained by said detecting means, wherein a servo control loop is constituted by said actuator, said detecting means and said control means;

means for applying a disturbance signal to the output of said control means; and means for adjusting parameters of said control means which determines the frequency transfer characteristics of the servo control loop by use of the output of said detecting means and the output of the control means to which said disturbance signal is applied, wherein the record medium is disk-shaped, and said system further comprises means for attenuating predetermined frequency components including the rotational frequency of the record medium from the output of said detection means used by said control means and the output of said control means to which said disturbance signal is applied.

2. A servo control system according to claim 1, wherein the disturbance signal is an M-sequence signal.

3. A servo control system according to claim 1, wherein said actuator comprises a tracking and/or focusing actuator.

4. A servo control system according to claim 1, wherein said control means comprises a digital compensator.

5. A servo control system according to claim 1, wherein the adjustment by said adjustment means is carried out by use of a method of least squares.

6. A servo control system according to claim 1, wherein a sampling period is $1/n$ times the rotational period of said record medium, where n designates an integer.

7. A servo control system which controls the position of a recording and/or reproducing head relative to a desired track on a record medium, said system comprising:

an actuator for moving said head relative to said track;

positional deviation detecting means for detecting a positional deviation of said head relative to said track and for outputting a positional deviation signal;

control means for outputting the control signals for said actuator in such a manner that said head is put in a desired position relative to said track, by use of the positional deviation signals obtained by said detecting means, wherein a servo control loop is constituted by said actuator, said detecting means and said control means;

means for applying a disturbance signal of plural frequencies to the output of said control means; and means for adjusting parameters of said control means which determines the transfer characteristics at each frequency of the servo control loop by use of the output of said detecting means and the output of the control means to which said disturbance signal is applied, wherein said control means comprises a digital compensator and said digital compensator is represented by the following equation:

$$D(z^{-1})u(k) = N(z^{-1})y(k)$$

where $$D(z^{-1}) = 1 + d_1 z^{-1} + \ldots + d_m z^{-m}$$

$$N(z^{-1}) + n_0 + n_1 z^{-1} + \ldots + n_p z^{-p},$$

k denotes a time, y(k) a value of the positional deviation signal at time k, u(k) a value of the control input at time k, and $z^{-1}$ an operator showing delays.

8. A data recording/reproducing device which records and/or reproduces data at the target track of a disk-like record medium, said device comprising:

an actuator for driving a recording and/or reproducing head;

detection means for detecting an error between said head and the target track;

control means for outputting a control signal of said actuator for driving said head in such a manner that said head is positioned at the target track, by use of an error signal obtained by said detection means, wherein a servo control loop is constituted by said actuator, said detection means, and said control means;

means for applying a disturbance signal to the output of said control means;

means for performing parameter adjustment of said control means which determines the frequency transfer characteristics of the servo control loop by use of the output of said detection means and the output of the control means to which said disturbance signal is applied; and means for attenuating predetermined frequency components including the rotational frequency of said record medium from the output of said detection means used in said control means and the output of the control means to which said disturbance signal is applied.

9. A data recording/reproducing device according to claim 8, wherein a sampling period is 1/n times the rotational period of the record medium, where n designates an integer.

* * * * *

UNITED STATES PATENT AND TRADEMARK OFFICE
CERTIFICATE OF CORRECTION

PATENT NO. : 5,233,586
DATED : August 3, 1993
INVENTOR(S) : Masahiro Morisada

It is certified that error appears in the above-indentified patent and that said Letters Patent is hereby corrected as shown below:

COLUMN 2

Line 7, "of" (second occurrence) should be deleted; and
   Line 14, "comprising;" should read --comprising:--.

COLUMN 3

Line 61, "2." should read --6.--.

COLUMN 4

Line 42, "first filter" should read --first filter 7--;
   Line 56, "well known" should read --well-known--; and
   Line 58, "where by the application of difference" should read --so that by using a differential--.

UNITED STATES PATENT AND TRADEMARK OFFICE
CERTIFICATE OF CORRECTION

PATENT NO. : 5,233,586
DATED : August 3, 1993
INVENTOR(S) : Masahiro Morisada

It is certified that error appears in the above-indentified patent and that said Letters Patent is hereby corrected as shown below:

COLUMN 5

Line 13, "$Z^{-1}$" should read --$z^{-1}$--; and $A(Z^{-1})$ should read $A(z^{-1})$; and
Line 47, "well known" should read --well-known--.

COLUMN 6

Line 20, "which minimizes" should read --this minimizes--;
Line 26, "is the result" should read --which is the result--;
Line 31, "By use of thus established," should read --By use of the thus established,--;
Line 32, "$A(Z^{-1})$, $B(Z^{-1})$" should read --$A(z^{-1})$, $B(z^{-1})$--;
Line 33, "$A(Z^{-1})$ and $B(Z^{-1})$" should read --$A(z^{-1})$ and $B(z^{-1})$--;
Line 35, "expression;" should read --expression:--; and
Line 49, "=0 In" should read --=0. In--.

UNITED STATES PATENT AND TRADEMARK OFFICE
CERTIFICATE OF CORRECTION

PATENT NO. : 5,233,586                    Page 3 of 3
DATED      : August 3, 1993
INVENTOR(S): Masahiro Morisada It is certified that error appears in the above-indentified patent and that said Letters Patent is hereby corrected as shown below:

COLUMN 7

Line 23, "analogue" should read --analog--; and
Line 37, "means" should read --mean--.

COLUMN 8

Line 67, "$N(z^{-1})+n_0+n_1z^{-1}+...+n_pz^{-p},$" should read --$N(z^{-1})=n_0+n_1z^{-1}+...+n_pz^{-p},$--.

Signed and Sealed this

Nineteenth Day of April, 1994

Attest:

BRUCE LEHMAN

*Attesting Officer*           *Commissioner of Patents and Trademarks*